United States Patent
Minoura et al.

(10) Patent No.: US 10,611,578 B2
(45) Date of Patent: Apr. 7, 2020

(54) CONVEYING OPERATION EQUIPMENT

(71) Applicants: Honda Motor Co., Ltd., Tokyo (JP); Daifuku Co., Ltd., Osaka (JP)

(72) Inventors: Takafumi Minoura, Tokyo (JP); Yoshifumi Yasuda, Shiga (JP)

(73) Assignees: Honda Motor Co., Ltd. (JP); Daifuku Co., Ltd. (JP)

( * ) Notice: Subject to any disclaimer, the term of this patent is extended or adjusted under 35 U.S.C. 154(b) by 0 days.

(21) Appl. No.: 16/268,009

(22) Filed: Feb. 5, 2019

(65) Prior Publication Data
US 2019/0248592 A1   Aug. 15, 2019

(30) Foreign Application Priority Data
Feb. 9, 2018  (JP) ................................. 2018-022142

(51) Int. Cl.
*B65G 25/04*   (2006.01)

(52) U.S. Cl.
CPC ..................... *B65G 25/04* (2013.01)

(58) Field of Classification Search
CPC ....... B65G 25/04; B65G 35/06; B65G 17/066
See application file for complete search history.

(56) References Cited

U.S. PATENT DOCUMENTS

| | | | | |
|---|---|---|---|---|
| 7,458,455 B2* | 12/2008 | Nakamura | ............ | B61B 13/127 198/463.3 |
| 7,658,275 B2* | 2/2010 | Hayashi | ................. | B65G 35/06 198/459.8 |
| 8,408,381 B2* | 4/2013 | Murakami | ............. | B65G 35/06 198/465.1 |
| 9,663,301 B2* | 5/2017 | Shiki | ..................... | B61B 13/127 |
| 10,472,175 B2* | 11/2019 | Minoura | ................ | B65G 35/06 |

* cited by examiner

*Primary Examiner* — William R Harp
(74) *Attorney, Agent, or Firm* — St. Onge Steward Johnston & Reens LLC

(57) ABSTRACT

Conveying operation equipment has a conveying carriage with an operating region between a workpiece support portion and a side of the conveying carriage. A reciprocating movement path of an operation device is provided such that part or the whole of the operation device is overlaid on the operating region on the conveying carriage and a synchronous forward-traveling mechanism which makes the operation device travel synchronously with the conveying carriage is formed with a transmission mechanism in an upper portion of the conveying carriage and a passive portion in a bottom portion of the operation device and a transmission state switch which switches the transmission mechanism to a transmission state at the beginning end position of the reciprocating movement path and which switches the transmission mechanism to a transmission release state at the terminal end position of the reciprocating movement path.

9 Claims, 9 Drawing Sheets

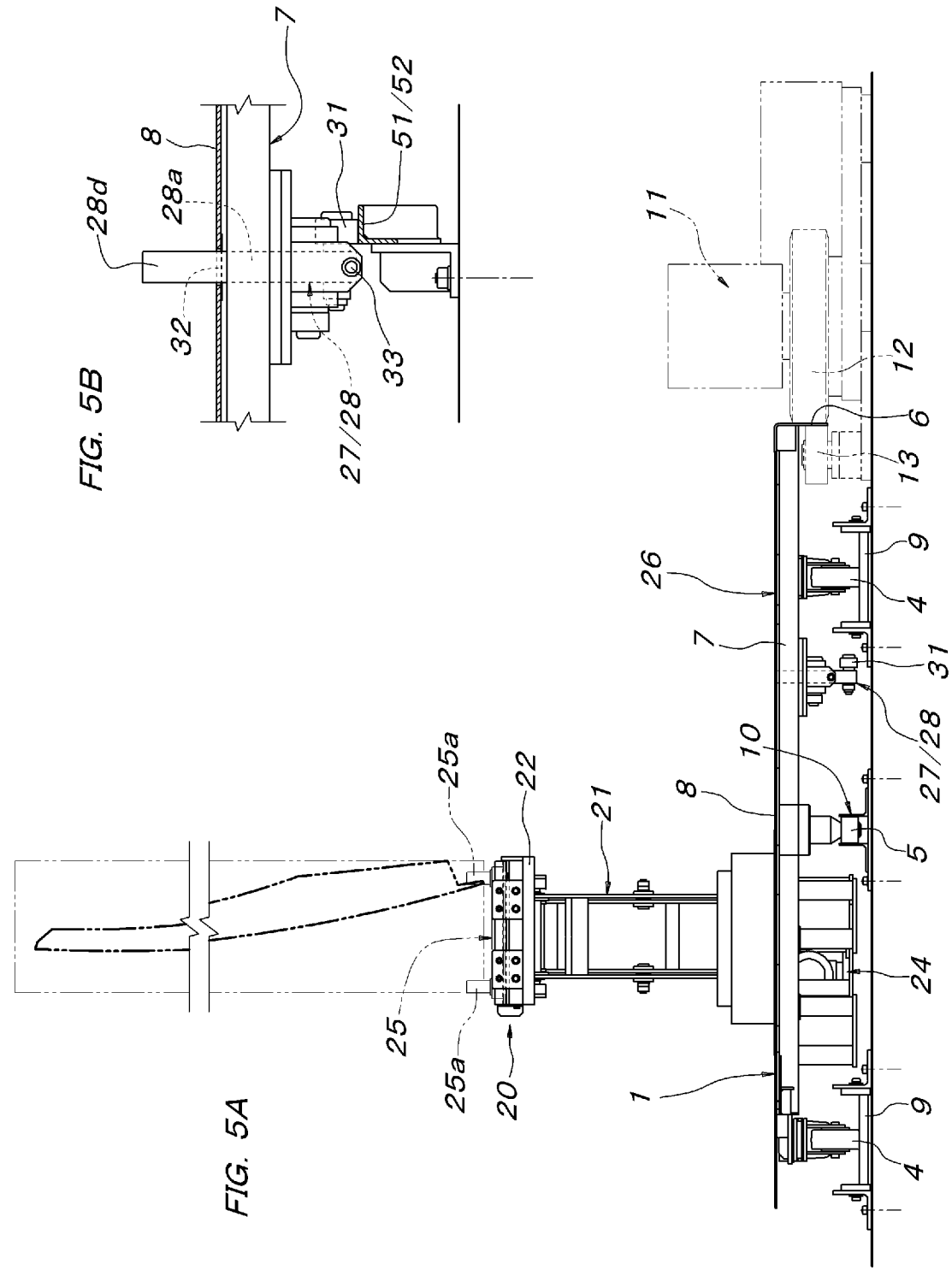

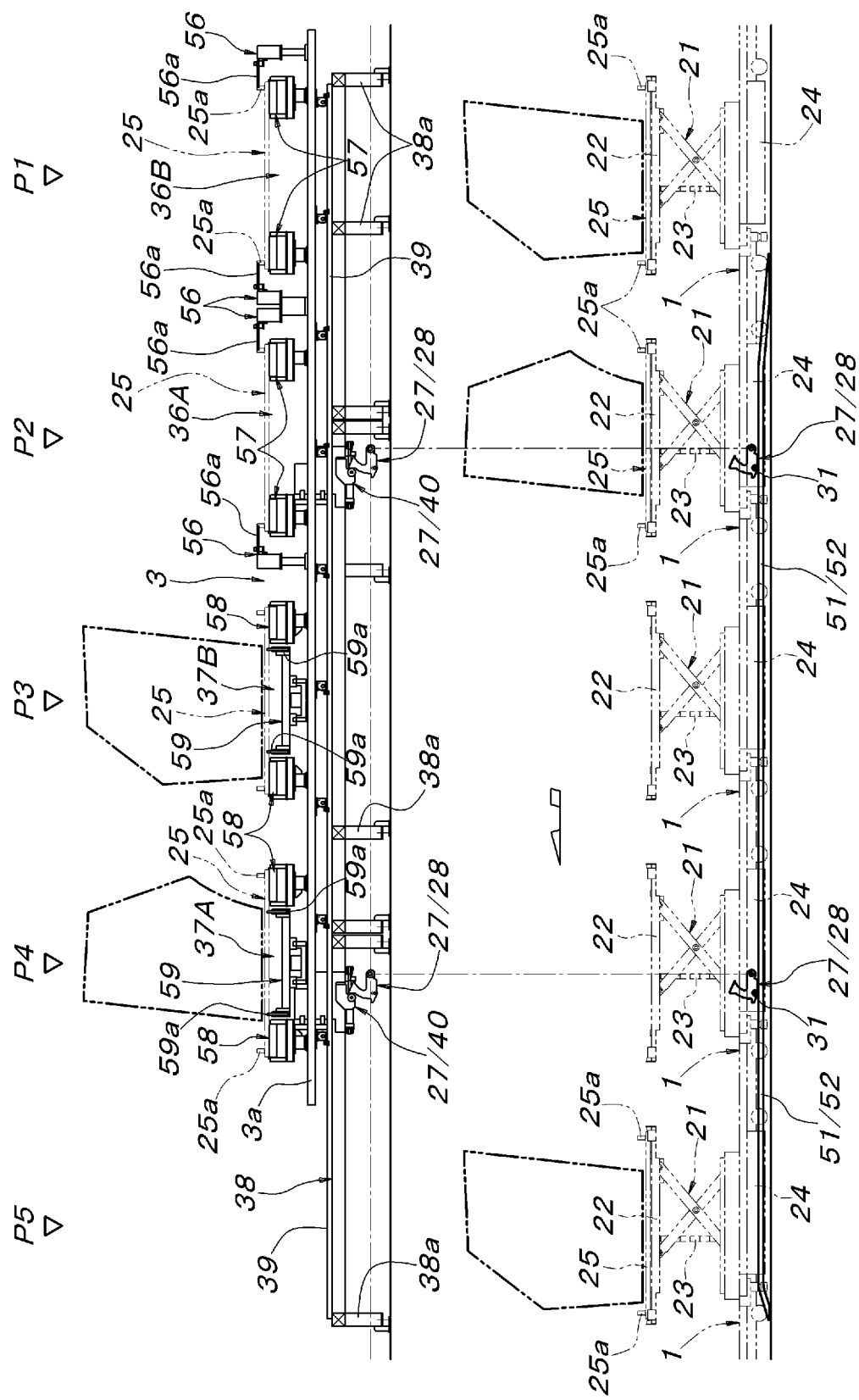

CONVEYING OPERATION EQUIPMENT

FIELD OF THE INVENTION

The present invention relates to conveying operation equipment having conveying carriages for workpieces.

BACKGROUND OF THE INVENTION

The present invention relates to conveying operation equipment in which a traveling path of conveying carriages that are coupled to each other so as to travel and a reciprocating movement path of an operation device for workpieces on the conveying carriages are arranged in parallel to each other, and in which a synchronous forward-traveling means that makes the operation device travel synchronously with the conveying carriage to be operated from a beginning end position to a terminal end position of the reciprocating movement path and a high speed retreat-traveling means that makes the operation device travel to retreat at a high speed from the terminal end position to the beginning end position of the reciprocating movement path are provided.

The conveying operation equipment as described above has been known as equipment in which, for example, an operation of mounting a part to a workpiece loaded on a workpiece support portion on each conveying carriage is performed by an operator who gets on the conveying carriage while the conveying carriage is traveling on the traveling path. In the conveying operation equipment described above, when an empty conveying carriage passes a workpiece loading position on the traveling path, an operation-ready workpiece is transferred onto the workpiece support portion of the empty conveying carriage, and when the conveying carriage after the completion of the operation on the workpiece passes a workpiece unloading position set in front of the workpiece loading position, the operation-completed workpiece is unloaded. In the conveying operation equipment described above, a workpiece transferring operation device is needed which travels in a certain section synchronously with the conveying carriage in order to load and unload the workpiece on and from the conveying carriage. In some cases, an operation device is also needed which travels in a certain section synchronously with the traveling conveying carriage in order to provide a part and an automatic tool to the operator on the conveying carriage.

In this type of conventional conveying operation equipment, although patent literature cannot be indicated, the following configuration has been known in which a reciprocating movement path of the operation device is provided beside the traveling path of the conveying carriage, a transmission means is provided which freely engages/disengages with and from a lateral side portion at which the operation device and the conveying carriage are adjacent to each other, a transmission member of the conveying carriage which is to pass by the operation device is made to engage with a passive portion of the operation device which is on standby at a beginning end position of the reciprocating movement path and thus the operation device is pushed from the rear by the conveying carriage so as to travel synchronously.

SUMMARY OF THE INVENTION

In the conveying operation equipment configured as described above, since the conveying carriage and the operation device individually engage with the lateral side portion such that the operation device travels synchronously with the conveying carriage, when thrust is transmitted from the conveying carriage to the operation device, a turning force in a horizontal direction is exerted on the operation device, and the same turning force in the horizontal direction is exerted as a reaction force on the side of the conveying carriage. The turning force in the horizontal direction as described above leads to various problems, for example, in which a frictional force in a horizontally lateral direction acts between the wheels or the guide rails of the operation device and the conveying carriage and smooth travel is inhibited, etc. Therefore, as the operation device which is made to travel synchronously, a large and heavy operation device cannot be utilized. Further, since the reciprocating movement path of the operation device is arranged beside the traveling path of the conveying carriage, in a region where the operation device is present, the lateral width of the equipment is remarkably increased, and moreover, in the equipment where the operation device loads and unloads the workpiece on and from a workpiece support portion on the conveying carriage, it is necessary to arrange the workpiece support portion on the conveying carriage so as to be significantly displaced to the side on which the reciprocating movement path of the operation device is present. Therefore, in order for the operation device for providing a part, etc., to provide a part and an automatic tool as described previously to the operator on the conveying carriage to be made to travel synchronously, it is necessary to arrange the operation device for providing a part, etc., on a side opposite to the side on which a workpiece loading/unloading operation device is present. In a general layout in which the traveling path of the conveying carriage is configured into a circulating path in which an outward path and a return path are aligned, within a closed linear region between the outward path and the return path of the circulating path, for example, it is necessary to arrange the operation device for providing a part, etc., with the result that this layout is not practical.

The present invention proposes conveying operation equipment which can solve the conventional problems described above, and for ease of understanding of a relationship with an embodiment which will be described later, the conveying operation equipment according to the present invention will be shown below with reference symbols which are used in the description of the embodiment and which are placed in parentheses. In conveying operation equipment in which a traveling path of conveying carriages (1) that are coupled to each other so as to travel and a reciprocating movement path of an operation device (3) for workpieces on the conveying carriages (1) are arranged in parallel to each other and in which a synchronous forward-traveling means that makes the operation device (3) travel synchronously with the conveying carriage (1) to be operated from a beginning end position to a terminal end position of the reciprocating movement path and a high speed retreat-traveling means (cylinder unit (35)) that makes the operation device (3) travel to retreat at a high speed from the terminal end position to the beginning end position of the reciprocating movement path are provided, on the conveying carriage (1), an operating region (26) is ensured between a workpiece loading region (workpiece support portion (20)) and a side of the conveying carriage, the reciprocating movement path is provided such that part or the whole of the operation device (3) is overlaid on the operating region (26) on the conveying carriage (1) and the synchronous forward-traveling means is formed with a transmission means (27) which is formed with a transmission member (28) that is provided in an upper portion of the conveying carriage (1) and a passive portion (40) that is provided in a bottom portion of the operation device (3) so as to be pushed from the rear by the transmission member (28) and a transmission state switching means (fixed cam rail (52)) which switches the transmission means (27) to a transmission state at the beginning end position of the reciprocating movement path and which switches the transmission means (27) to a transmission release state at the terminal end position of the reciprocating movement path.

According to the configuration of the present invention, part or the whole of the operation device which is made to travel synchronously with the conveying carriage is provided so as to be overlaid on the operating region on the conveying carriage, it is therefore possible to narrow the lateral width of the equipment in the region where the reciprocating movement path of the operation device is present. Since the transmission means for making the operation device and the conveying carriage engage with each other such that the operation device is made to travel synchronously with the conveying carriage makes the upper portion of the conveying carriage and the bottom portion of the operation device which are vertically overlaid engage with each other, as compared with a configuration in which the lateral side portions of the operation device and the conveying carriage are made to engage with each other, when thrust is transmitted from the conveying carriage to the operation device, a turning force in a horizontal direction is prevented from being exerted on the operation device and/or the conveying carriage or the turning force can be reduced. Therefore, it is possible to eliminate or curb problems such as the inhibition of smooth travel of the operation device and/or the conveying carriage, and the present invention can be implemented even on a large and heavy operation device. Further, even in a general layout in which the traveling path of the conveying carriage is configured into a circulating path in which an outward path and a return path are aligned, it is configured such that the workpiece support portion on the conveying carriage is arranged so as to be displaced to the inner side of the conveying carriage adjacent to a linear region between the outward path and the return path, a workpiece loading/unloading operation device on the workpiece support portion is arranged so as to be overlaid on the operating region between the workpiece support portion and the outer side of the conveying carriage and thus the loading and unloading of the workpiece with respect to the workpiece support portion can be performed without any problem. Moreover, the reciprocating movement path of an operation device for providing a part, etc., to provide a part and an automatic tool to an operator on the conveying carriage on the traveling path which is separated from the workpiece loading/unloading operation device is also aligned with the outer side of the conveying carriage, it is therefore possible to ensure an operating region which has a wide lateral width on the conveying carriage between the operation device for providing a part, etc., and the workpiece on the workpiece support portion.

Specifically, in a case where the present invention is implemented, it is possible to configure such that the transmission member (28) of the transmission means (27) is pivotally supported so as to be able to vertically swing between an operating posture of a raising limit and a retracting posture of a lowering limit through an opening portion (32) provided in a floor surface of the conveying carriage (27), and when the transmission member (28) is in the retracting posture of the lowering limit, an upper end portion (28d) of the transmission member (28) is flush with the floor surface so as to block the opening portion (32). According to this configuration, the operating region between the workpiece loading region of the conveying carriage and the side of the conveying carriage in which the operation device is not in an interlocked state can be made as a flat floor surface, and thus the operator who gets on in the operating region can safely perform an operation. Further, it is possible to configure such that a sandwiching member (43) which sandwiches, with a passive portion (40), the upper end portion (28d) of the transmission member (28) in the operating posture that makes contact with the passive portion (40) is provided together with the passive portion (40) of the transmission means (27), and the sandwiching member (43) is freely switched between an operating position where the upper end portion (28d) of the transmission member (28) is sandwiched and a retracting position which is separated from the vertical swing path of the transmission member (28). According to this configuration, the operation device does not move ahead of the conveying carriage to be synchronized due to inertia, and the operation device and the conveying carriage to be synchronized can be fully integrated.

It is possible to configure such that the passive portion (40) of the transmission means (27) is attached to a raising/lowering member (41), and when the raising/lowering member (41) is in the lowering limit, the upper end portion (28d) of the transmission member (28) can be sandwiched between the passive portion (40) and the sandwiching member (43) whereas when the raising/lowering member (41) is in the raising limit, the passive portion (40) is separated upward from the transmission member (28) in the operating position, and a transmission member receiving roller (42) which is self-rotated when the passive portion (40) is relatively vertically moved with the transmission member (28) is pivotally supported on the passive portion (40). According to this configuration, without the transmission member being switched from the operating posture to the retracting posture, the raising/lowering member is switched from the lowering limit to the raising limit so as to separate the operation device from the conveying carriage. Therefore, without providing a drive means for switching the transmission member to the retracting posture in the conveying carriage or on the side of the traveling path, the operation device can easily be separated from the conveying carriage at an appropriate timing.

It is possible to configure such that a cam follower roller (31) is attached to the transmission member (28), and the transmission state switching means is formed with a fixed cam rail (52) which is laid along the reciprocating movement path of the operation device (3) such that the transmission member (28) is switched via the cam follower roller (31) to the operating posture and that the operating posture is held. According to this configuration, as compared with a case where a drive means for switching the transmission member to the retracting posture is provided in the conveying carriage or on the side of the traveling path, the present invention can be implemented at a very low cost. In this configuration in which the posture of the transmission member (28) is switched by the cam follower roller (31) and the fixed cam rail (52), in a case where, as described above, the sandwiching member (43) which sandwiches, with the passive portion (40), the upper end portion (28d) of the transmission member (28) in the operating position that makes contact with the passive portion (40) is used together, it is possible to configure such that, when the upper end portion (28d) of the transmission member (28) is sandwiched between the sandwiching member (43) and the passive portion (40), the transmission member (28) in the operating posture is moved upward such that the cam follower roller (31) is separated from the fixed cam rail (52).

According to this configuration, when the operation device is synchronously driven by the transmission member on the side of the conveying carriage, it is possible to avoid a large load continuously acting on the side of the fixed cam rail which switches the transmission member to the operating posture, and moreover, depending on the situation, it is also possible to install the fixed cam rail only on the side of the beginning end position of the reciprocating movement path of the operation device to reduce the cost.

It is noted that, it is possible to configure such that the reciprocating movement path of the operation device (3) is formed with an operation device supporting guide rail (39) which is laid on a cantilever support frame (38) that overhangs from a frame (38a) installed beside the traveling path of the conveying carriage (1) over the conveying carriage (1), and the operation device (3) has such a lateral width that the entire operation device (3) is overlaid on the operating region (26) of the conveying carriage (1). In this case, when the operation device (3) is a workpiece transferring operation device which includes a workpiece transferring means (36A to 37B) which receives/delivers the workpiece from/to a workpiece support portion (20) on the conveying carriage (1), it is possible to configure such that a workpiece conveying conveyor (53, 54) is provided beside the traveling path of the conveying carriage (1) such that part or the whole thereof is overlaid on the frame (38a), and thus the workpiece can be transferred between the conveyor (53, 54) and the workpiece transferring means (36A to 37B) on the operation device (3).

BRIEF DESCRIPTION OF DRAWINGS

FIG. 5A is a rear view of one conveying carriage and FIG. 5B is an enlarged rear view of a main portion showing a state where the transmission member of the conveying carriage is pushed up to an operating position by a fixed guide rail.

FIG. 6 is an illustrative view illustrating situations in which the operation device is made to travel synchronously by the transmission member on the side of the conveying carriage.

DETAILED DESCRIPTION OF THE INVENTION

Figure 1:
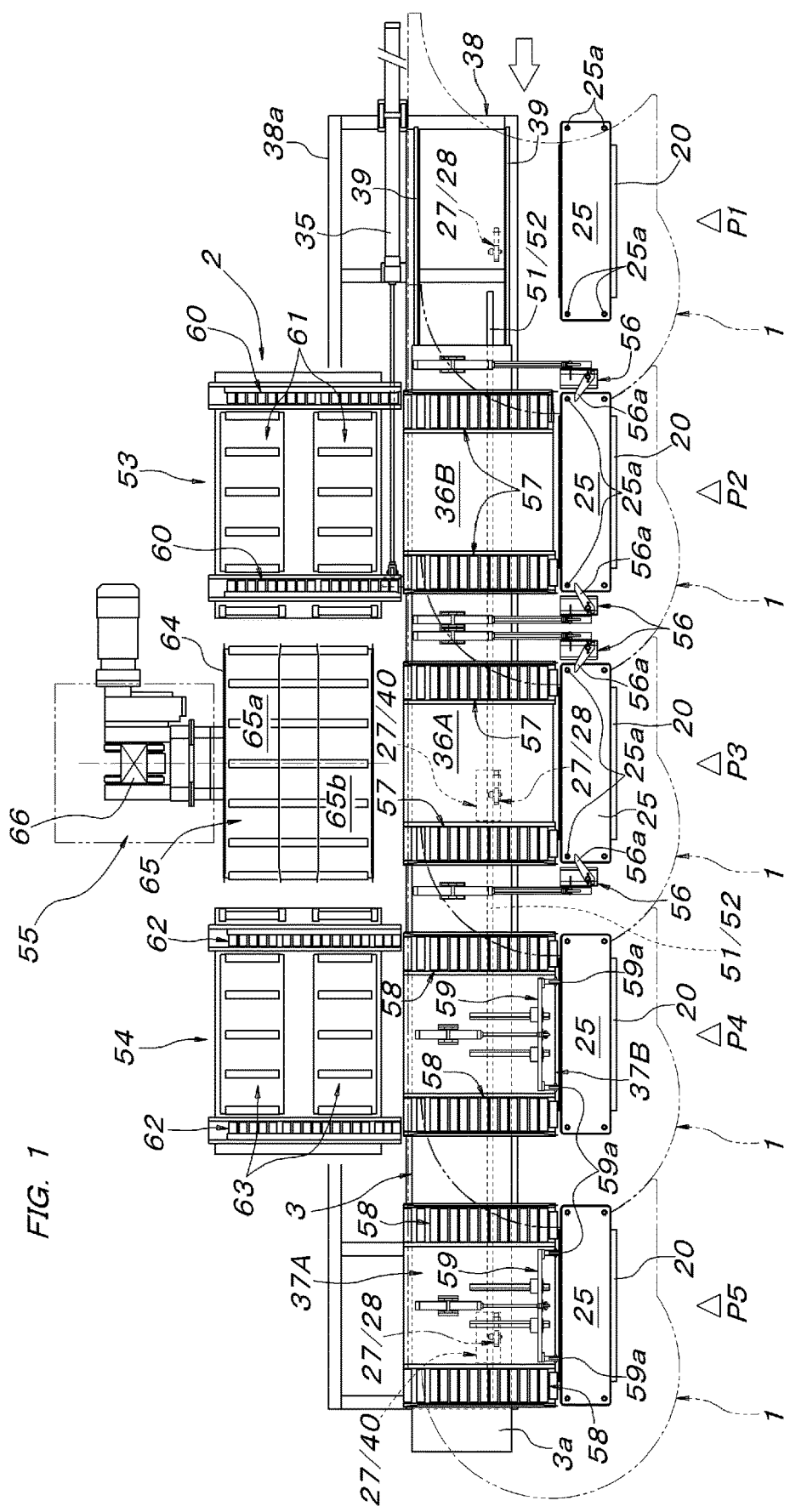
FIG. 1 is a plan view showing a main portion of conveying operation equipment.

In FIG. 1, reference symbol 1 denotes a conveying carriage, and the conveying carriages travel, in a state where they are coupled to each other, on a circulating traveling path in which a linear outward path section and a linear return path section are aligned and in which both the path sections are coupled at both ends with U-turn path sections, and workpiece transfer equipment shown in FIG. 1 is provided in the vicinity of a path terminal end of either one of the linear outward path section and the linear return path section or in the vicinity of path terminal ends of both thereof. The workpiece transfer equipment is arranged on an outer side (outer side opposite to the side on which a closed region between both reciprocating path sections that are aligned is present, and the same shall apply hereinafter) of the traveling path of the conveying carriage 1, and is formed with a workpiece conveying conveyor 2 and a workpiece transferring operation device 3 which is provided so as to be overlaid on the conveying carriages 1.

In each of the conveying carriages 1, as shown in FIGS. 4A to 5A, a floor board 8 is laid on a frame portion 7 that includes two front and rear sets of pairs of left and right wheels 4, a guide roller 5 which is pivotally supported with a vertical support shaft, and a friction driving band-shaped plate 6 which is arranged on one side in parallel to a travel direction. The wheels 4 are placed on a pair of left and right band-shaped rail plates 9 laid along the traveling path of the conveying carriage 1 so as to freely roll. The guide roller 5 is loosely fitted into a groove-shaped guide rail 10 laid in the intermediate position of both the band-shaped rail plates 9 along the traveling path of the conveying carriage 1 such that the guide roller 5 is self-rotatable. In an appropriate portion of the traveling path of the conveying carriage 1, a friction driving means 11 is arranged which drives and propels the conveying carriage 1 via the friction driving band-shaped plate 6. The friction driving means 11 is a conventional known friction driving means, and is formed with a frictional drive wheel 12 which is pressed against the friction driving band-shaped plate 6 and which is driven with a motor and a backup load bar 13 which sandwiches the friction driving band-shaped plate 6 with the frictional drive wheel 12.

The floor board 8 of the conveying carriage 1 is formed with a front overhanging floor board portion 15 which includes a protruding arc edge 15a that is concentric with a vertical support shaft 14 for pivotally supporting the guide roller 5 at a lower end and that has a circumferential length exceeding 180 degrees and a rear floor board portion 16 which is continuous with the rear side of the front overhanging floor board portion 15. The lateral width of the rear floor board portion 16 between both linear left and right sides which are parallel to each other is smaller than the diameter of the front overhanging floor board portion 15, and the outer side (side on which the friction driving band-shaped plate 6 is present, and the same shall apply hereinafter) of both the left and right sides is connected to the protruding arc edge 15a of the front overhanging floor board portion 15 in a tangential direction. The rear side of the rear floor board portion 16 is a concave arc edge 16a whose radius of curvature is slightly larger than that of the protruding arc edge 15a of the front overhanging floor board portion 15, and the frame portion 7 overhangs into an inner region of the concave arc edge 16a. In the rear end of a rod-shaped main member 17 of the frame portion 7 in a forward/backward direction which has the vertical support shaft 14 at a front end, a coupling shaft hole 18 is provided which is concentric with the arc center of the concave arc edge 16a of the rear floor board portion 16 and through which the vertical support shaft 14 of the conveying carriage 1 on the rear side is passed. The vertical support shaft 14 which pivotally supports the guide roller 5 at the lower end is freely inserted/removed with respect to a vertical coupling shaft hole 19 at the front end of the rod-shaped main member 17 in an up/down direction together with the guide roller 5.

In the conveying carriages 1 configured as described above, the coupling shaft hole 19 of the conveying carriage 1 on the rear side is concentrically overlaid on the coupling shaft hole 18 of the conveying carriage 1 on the front side, and the vertical support shaft 14 is inserted so as to penetrate through both the coupling shaft holes 18 and 19 together with the guide roller 5 at the lower end and is fixed, with the result that the conveying carriages 1 adjacent in the forward/backward direction are coupled horizontally around the vertical support shaft 14 so as to freely relatively swing. Here, the front overhanging floor board portion 15 of the conveying carriage 1 on the rear side is supported on the frame portion 7 which overhangs into the inner region of the concave arc edge 16a in the rear floor board portion 16 of the conveying carriage 1 on the front side such that the front overhanging floor board portion 15 freely relatively swings. When the conveying carriages 1 travel in the U-turn path section of the traveling path, the protruding arc edge 15a in the front end of the floor board 8 of the conveying carriage 1 on the rear side is adjacent to the concave arc edge 16a in the rear end of the conveying carriage 1 on the front side, and thus the conveying carriages 1 are relatively horizontally turned around the arc center thereof. In both the linear reciprocating path sections of the traveling path of the conveying carriage 1, the friction driving band-shaped plates 6 on the outer sides of the respective conveying carriages 1 are linearly continuous in parallel to the travel direction, and thus the respective conveying carriages 1 can be continuously driven by the friction driving means 11 so as to travel forward.

On the respective conveying carriages 1 which can be made to travel on the traveling path in a state where they are coupled to each other so as to be continuous in the shape of a band as described above, in a position close to the center of a half region of the inner side (side opposite to the side on which the friction driving band-shaped plate 6 is present, and the same shall apply hereinafter) of the floor board 8, a workpiece support portion 20 is provided. The workpiece support portion 20 is formed with a workpiece support base 22 which is supported by a pantograph mechanism 21 so as to be freely raised/lowered, a drive chain 23 which pushes up the workpiece support base 22 so as to raise the workpiece support base 22 and which is freely bent to only one side, and a drive means 24 which drives the drive chain 23 so as to push up or pull back the drive chain 23. The workpiece support base 22 is configured to be able to transfer, from the outside of the workpiece support base 22 held in a raising limit position, in a laterally horizontal direction, a workpiece mounting pallet 25 in the shape of a rectangular slab which is long in the travel direction of the conveying carriage 1.

A region around the workpiece support portion 20 on the floor board 8 of the conveying carriage 1 is a flat work floor on which an operator gets on so as to perform various operations on the workpiece supported, via the workpiece mounting pallet 25, on the workpiece support portion 20, and in this embodiment, a region of the work floor which is present on the outer side of the workpiece support portion 20 and whose left/right lateral width is wide is particularly referred to as an operating region 26. In every other conveying carriage 1, in the vicinity of the center of the left/right lateral width of the operating region 26, a transmission member 28 is provided which forms a transmission means 27 to the workpiece transferring operation device 3 in the workpiece transfer equipment shown in FIG. 1.

Figure 8:
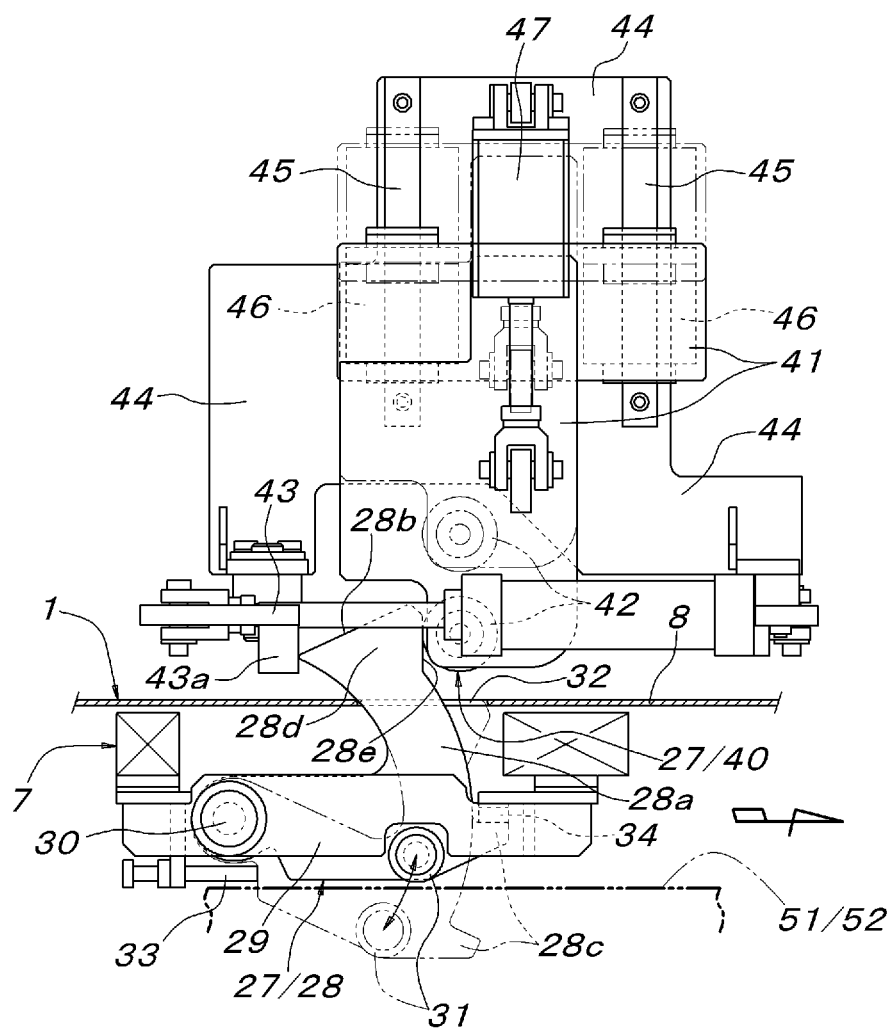
FIG. 8 is a partial vertical cross-sectional side view showing a main portion when the operation device is in a state of traveling synchronously with the conveying carriages by a transmission means.
Figure 9A:
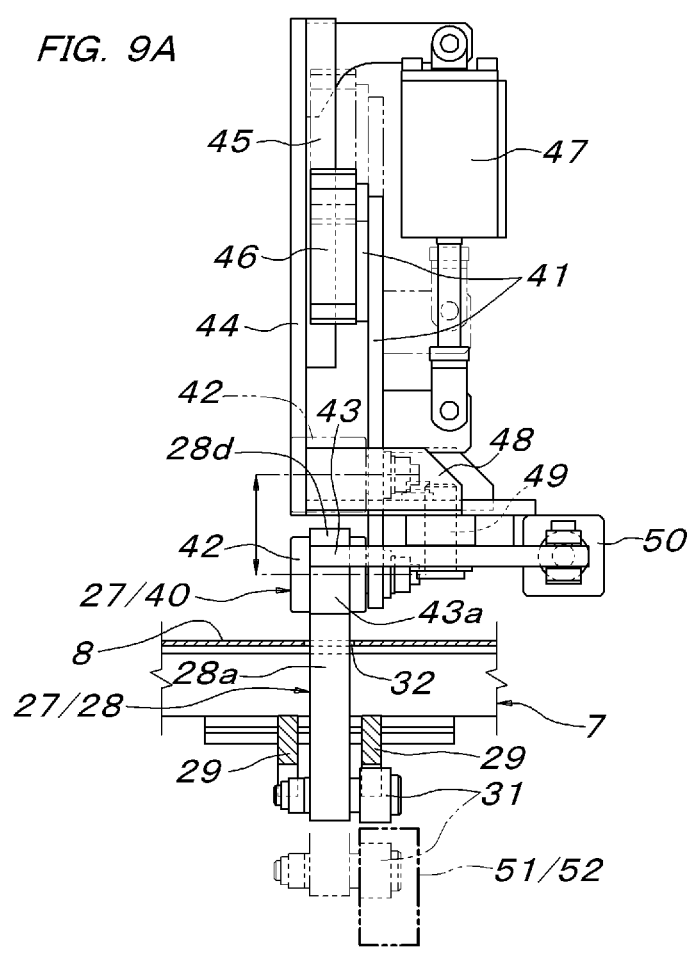
FIG. 9A is a vertical cross-sectional rear (left side) view and FIG. 9B is a plan view of a main portion in FIG. 8.

As shown in FIGS. 8 and 9A, in the transmission member 28, between a pair of left and right bearing plates 29 attached to the lower side of the frame portion 7, a rear end portion is pivotally supported with a horizontal support shaft 30 in a lateral direction so as to freely vertically swing, on one side of a front end portion, a cam follower roller 31 is provided which is pivotally supported with a horizontal support shaft in parallel to the horizontal support shaft 30 and the transmission member 28 includes an arc-shaped extended portion 28a which is extended upward and backward from the front end portion concentrically with the horizontal support shaft 30. An opening portion 32 through which the arc-shaped extended portion 28a penetrates and swings so as to rise and lower when the transmission member 28 swings upward around the horizontal support shaft 30 is provided in the floor board 8. A lowering limit stopper 33 which restricts the downward swinging of the transmission member 28, whose position in the forward/backward direction is freely adjusted and which utilizes a bolt is attached to the lower side of the rear end portion between the bearing plates 29. It is configured such that, when the transmission member 28 is brought, due to its own weight, into a retracting posture of the lowering limit in which the transmission member 28 is received by the lowering limit stopper 33, an upper end surface 28b of the arc-shaped extended portion 28a closes the opening portion 32 in a state where the upper end surface 28b is flush with the front surface of the floor board 8. A contact portion 28c which is provided so as to protrude forward from the front end portion of the transmission member 28 makes contact with the lower side of a raising limit stopper 34 provided between the front end portions of the bearing plates 29 so as to determine the raising limit of the transmission member 28. Here, the transmission member 28 is brought into an operating posture of the raising limit in which an upper end portion 28d of the transmission member 28 penetrates the opening portion 32 upward so as to reach a certain height above the floor board 8. In the upper end portion 28d of the transmission member 28, a contact surface 28e is provided which is directed perpendicularly to the floor board 8 and forward so as to face the front when the transmission member 28 is brought into the operating posture of the raising limit.

Figure 7:
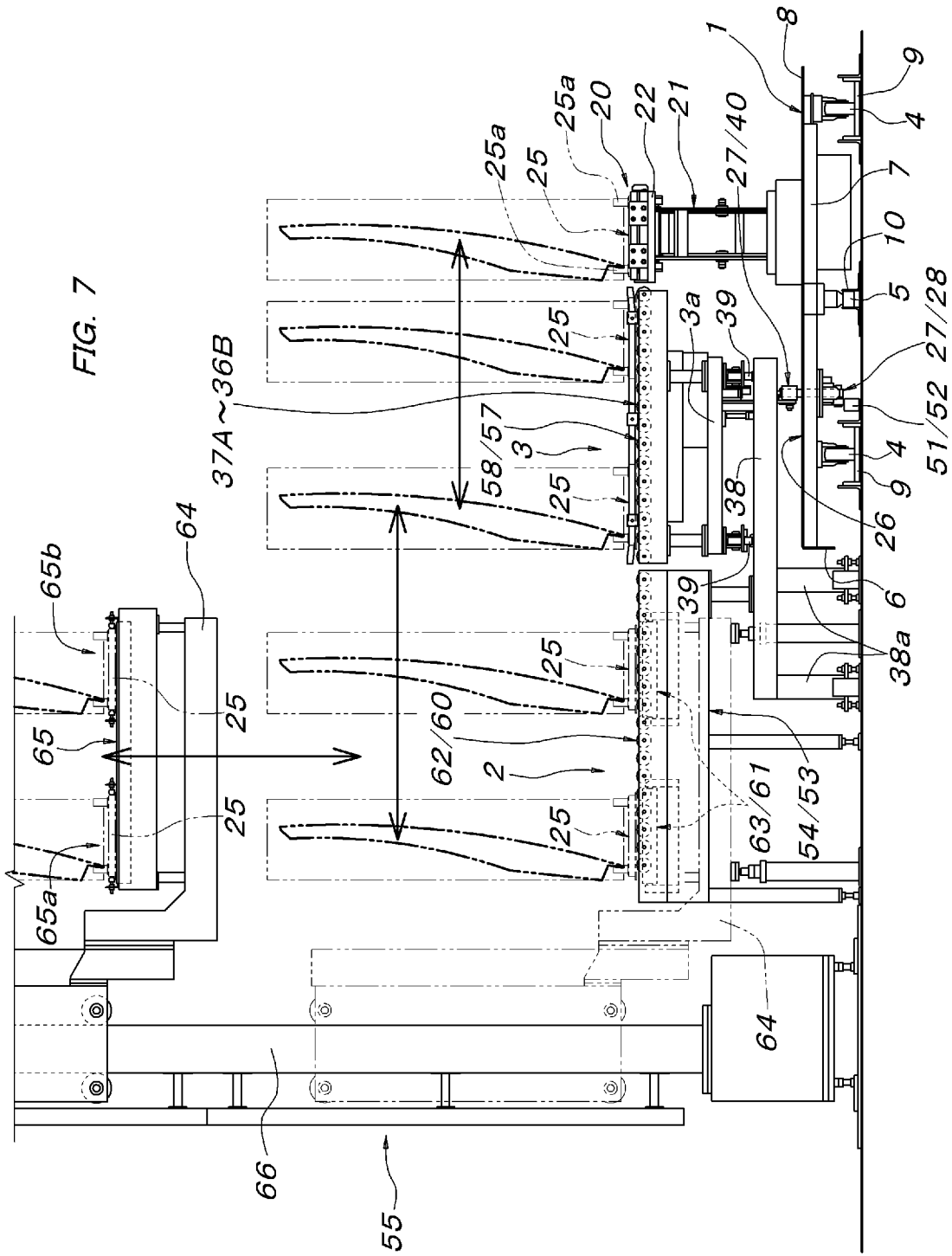
FIG. 7 is a front view illustrating a positional relationship between a workpiece support portion on the conveying carriage, a workpiece transferring operation device, and a workpiece conveying conveyor.

As shown in FIG. 1, in the workpiece transferring operation device 3, on a carriage 3a which is longer than the total length of four conveying carriages 1 in series, two workpiece receiving transfer means 36A and 36B on the rear side and two workpiece pushing/placing transfer means 37A and 37B on the front side are provided at the same intervals as the conveying carriages 1. As shown in FIG. 7, the carriage 3a of the workpiece transferring operation device 3 is supported by a pair of left and right operation device supporting guide rails 39 laid on a cantilever support frame 38 which overhangs from a frame 38a installed on the outer side of the traveling path of the conveying carriage 1 over the operating region 26 of the conveying carriage 1 such that the carriage 3a freely reciprocates and moves on a reciprocating movement path whose length corresponds to the length of one conveying carriage 1. Moreover, as a high speed retreat-traveling means which makes the workpiece transferring operation device 3 travel to retreat at a high speed from a terminal end position to a beginning end position of the reciprocating movement path, a cylinder unit 35 is interposed between the carriage 3a and the frame 38a of the workpiece transferring operation device 3.

The workpiece transferring operation device 3 has such a lateral width that its entirety including the respective transfer means 36A to 37B on the carriage 3a is overlaid on the operating region 26 of the conveying carriage 1. The respective transfer means 36A to 37B are at a height corresponding to the workpiece support base 22 held at a raising limit height in the workpiece support portion 20 on the conveying carriage 1, and can laterally transfer the workpiece mounting pallet 25 in a horizontally lateral direction with the workpiece support base 22.

When the workpiece transferring operation device 3 receives thrust from the conveying carriage 1 so as to travel synchronously, the cylinder unit 35 serving as the high speed retreat-traveling means of the workpiece transferring operation device 3 is brought into a free state so as to follow the travel of the workpiece transferring operation device 3 and perform an extension operation. As will be described later, even in a stage in which the workpiece transferring operation device 3 is made to travel synchronously with the conveying carriage 1, as necessary, the cylinder unit 35 can be utilized as a means for making the workpiece transferring operation device 3 travel at a higher speed than a synchronous travel speed in a synchronous travel direction.

In the carriage 3a of the workpiece transferring operation device 3, a passive portion 40 which forms, together with the transmission member 28, the transmission means 27 to the workpiece transferring operation device 3 is provided in two places corresponding to the transmission members 28 of the two front and rear conveying carriages 1 when the two front and rear conveying carriages 1 including the transmission members 28 are located at positions corresponding to the front workpiece receiving transfer means 36A of the workpiece receiving transfer means 36A and 36B and the front workpiece pushing/placing transfer means 37A of the workpiece pushing/placing transfer means 37A and 37B.

Figure 9B:
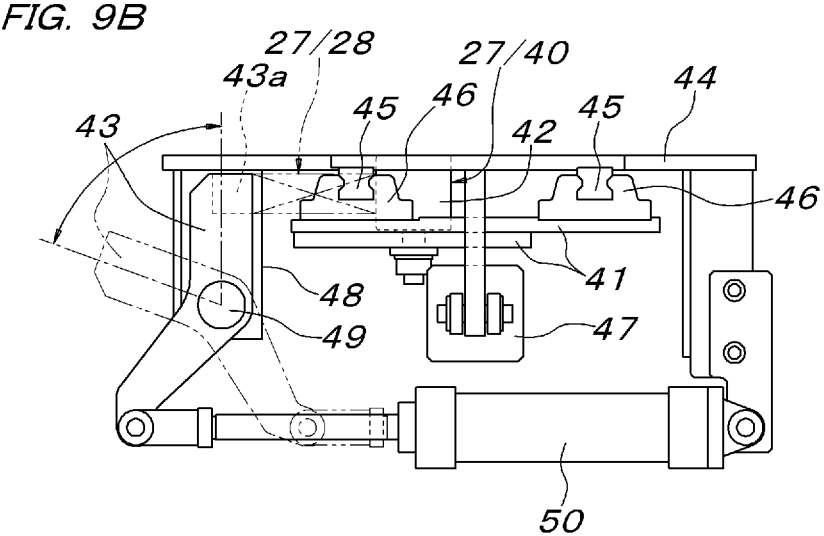

As shown in FIGS. 8 to 9B, the passive portion 40 is formed with a raising/lowering member 41 and a transmission member receiving roller 42 which is pivotally supported on the lower end of the raising/lowering member 41 with a horizontal support shaft in the lateral direction, and a sandwiching member 43 is provided together with the passive portion 40. The raising/lowering member 41 of the passive portion 40 is supported on a supporting vertical plate 44 fixed to the carriage 3a via slide rails 45 and slide blocks 46 fitted thereto so as to be freely raised/lowered, and is driven by a cylinder unit 47 interposed with the supporting vertical plate 44 so as to be raised/lowered between a lowering limit position and a raising limit position. When the raising/lowering member 41 is at the lowering limit position, the transmission member receiving roller 42 can receive the upper end portion 28d (contact surface 28e) of the transmission member 28 in the operating posture in the conveying carriage 1 which travels forward. The sandwiching member 43 is pivotally supported with a vertical support shaft 49 to the lower side of the tip end of a bearing member 48 which is provided so as to protrude from the supporting vertical plate 44, and is driven by a cylinder unit 50 interposed horizontally with the supporting vertical plate 44 so as to swing horizontally between a sandwiching posture and a retracting posture. In the sandwiching member 43, a sandwiching portion 43a is additionally provided which sandwiches the upper end portion 28d of the transmission member 28 of the conveying carriage 1 in the operating posture with the transmission member receiving roller 42 of the passive portion 40 which is switched to the lowering limit position by the cylinder unit 47, when the sandwiching member 43 is switched to the switching posture by the cylinder unit 50.

As shown in FIG. 6, on the traveling path of the conveying carriage 1, a fixed cam rail 52 is laid which serves as a transmission state switching means 51 for controlling the transmission member 28 included in the conveying carriage 1. The fixed cam rail 52 pushes up the cam follower roller 31 included in the transmission member 28 so as to switch the transmission member 28 to the operating posture. The fixed cam rail 52 has a length corresponding to the length from a position which is separated by an appropriate distance to the upper side with respect to the passive portion 40 included in the workpiece receiving transfer means 36A when the workpiece transferring operation device 3 (carriage 3a) is located at the beginning end position of the reciprocating movement path to a position which is separated slightly to the lower side with respect to the passive portion 40 included in the workpiece pushing/placing transfer means 37A when the workpiece transferring operation device 3 (carriage 3a) is located at the terminal end position of the reciprocating movement path. The fixed cam rail 52 includes, on the beginning end side, a rising gradient portion which has such a low angle as to gradually push up the cam follower roller 31 included in the transmission member 28.

The workpiece conveying conveyor 2 shown in FIG. 1 is formed with a workpiece carry-out conveyor 53 which is connected to the workpiece receiving transfer means 36A when the workpiece transferring operation device 3 (carriage 3a) is located at the beginning end position of the reciprocating movement path (FIG. 1 shows a state at the terminal end position), a workpiece carry-in conveyor 54 which is connected to the workpiece pushing/placing transfer means 37A, and a workpiece raising/lowering conveying means 55 which is arranged between the workpiece carry-out conveyor 53 and the workpiece carry-in conveyor 54. The workpiece receiving transfer means 36A and 36B include a pair of workpiece mounting pallet lead-in means 56 which lead in the workpiece mounting pallet 25 from the top of the workpiece support portion 20 (workpiece support base 22 in the raising limit position) of the conveying carriage 1 and two rows of roller conveyor units 57 which laterally convey the workpiece mounting pallet 25 led in by the workpiece mounting pallet lead-in means 56 to the side on which the workpiece carry-out conveyor 53 is present. The workpiece pushing/placing transfer means 37A and 37B include two rows of roller conveyor units 58 which laterally convey the workpiece mounting pallet 25 received from the workpiece carry-in conveyor 54 to the side on which the workpiece support portion 20 (workpiece support base 22 in the raising limit position) of the conveying carriage 1 and a workpiece mounting pallet pushing/placing means 59 which pushes and places the workpiece mounting pallet 25 conveyed by the roller conveyor units 58 onto the workpiece support portion 20 (workpiece support base 22 in the raising limit position) of the conveying carriage 1.

The workpiece carry-out conveyor 53 includes a pair of roller conveyor units 60 which are connected to the pair of roller conveyor units 57 of the workpiece receiving transfer means 36A and 36B and two rows of raising/lowering roller conveyor units 61 which are provided between the pair of roller conveyor units 60 so as to be freely raised/lowered and which feed out, when in a raising position, the two workpiece mounting pallets 25 received from the top of the roller conveyor units 60 onto the workpiece raising/lowering conveying means 55. The workpiece carry-in conveyor 54 includes a pair of roller conveyor units 62 which are connected to the pair of roller conveyor units 58 of the workpiece pushing/placing transfer means 37A and 37B and two rows of raising/lowering roller conveyor units 63 which are provided between the pair of roller conveyor units 62 so as to be freely raised/lowered and which feed out, when in a raising position, the two workpiece mounting pallets 25 received from the top of the workpiece raising/lowering conveying means 55 onto the roller conveyor units 62.

In the workpiece raising/lowering conveying means 55, a roller conveyor unit 65 that includes two rows of conveyance lines 65*a* and 65*b* whose both ends are connected to the two rows of raising/lowering roller conveyor units 61 in the raising limit of the workpiece carry-out conveyor 53 and the two rows of raising/lowering roller conveyor units 63 in the raising limit of the workpiece carry-in conveyor 54 is mounted on a raising/lowering carriage 64. As shown in FIG. 7, the raising/lowering carriage 64 is raised/lowered along a raising/lowering guide column 66, and thus the workpiece mounting pallet 25 can be transferred between the top of the raising/lowering carriage 64 (roller conveyor unit 65) and a conveyance path on another floor.

An example of a method of using the conveying operation equipment configured as described above will be described. The respective conveying carriages 1 continuously travel on the traveling path at a constant speed in a direction of movement from a fixed position P1 to a fixed position P5 shown in FIGS. 2A to 3C. An operation-completed door on the conveying carriage 1 which travels from the upper side to approach the fixed position P1 is unloaded from the top of the conveying carriage 1 by the workpiece receiving transfer means 36A and 36B of the workpiece transferring operation device 3, and on the conveying carriage 1 whose workpiece support portion 20 is empty, an operation-ready door is transferred onto the workpiece support portion 20 by the subsequent workpiece pushing/placing transfer means 37A and 37B.

Figure 2A:
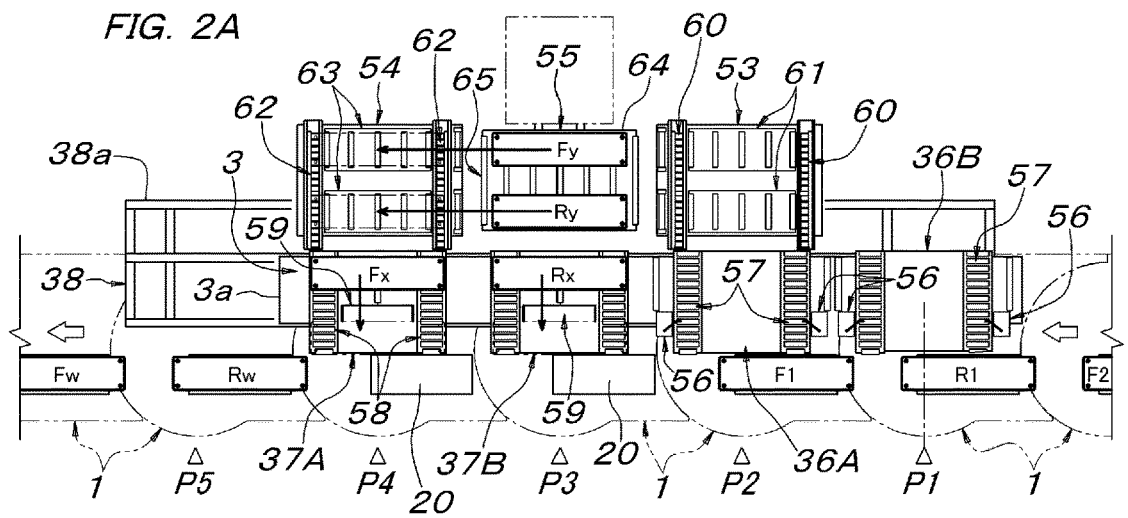
FIGS. 2A to 2C are schematic plan views illustrating the progress of workpiece transfer from a state where an operation device is at a beginning end position of a reciprocating movement path until immediately after the operation device starts to travel synchronously with conveying carriages.
Figure 2B:
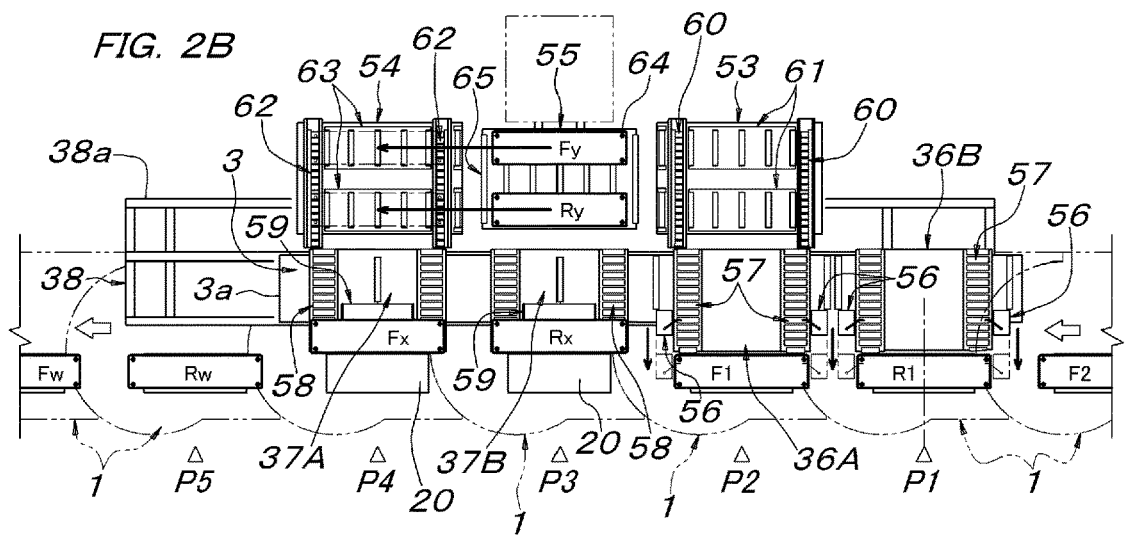

A specific description will be given below with reference to FIGS. 2A to 3C. As shown in FIGS. 2A, 2B and 3C, when the workpiece transferring operation device 3 (carriage 3*a*) is at the beginning end position of the reciprocating movement path, the workpiece receiving transfer means 36A is at the fixed position P2, the workpiece receiving transfer means 36B is at the fixed position P1, the workpiece pushing/placing transfer means 37A is at the fixed position P4, the workpiece pushing/placing transfer means 37B is at the fixed position P3, and the fixed position P5 is empty. It is noted that, in this embodiment, each of the conveying carriages 1 conveys the workpiece mounting pallet 25 on the circulating traveling path in a state where the workpiece mounting pallet 25 on which a door of an automobile serving as a workpiece is set is supported on the workpiece support portion 20, and in the middle of the conveyance, the operator who gets on the work floor around the workpiece support portion 20 can perform various operations on the door on the workpiece support portion 20. Specifically, a description will be given on an assumption that a front door is conveyed by the conveying carriage 1 on the front side which includes the transmission member 28 and a rear door is conveyed by the conveying carriage 1 on the rear side which does not include the transmission member 28, and in FIGS. 2A to 3C, the workpiece mounting pallets 25 on which the operation-ready/operation-completed front doors are set are indicated by operation-ready/operation-completed workpiece mounting pallets F1 to Fy and the workpiece mounting pallets 25 on which the operation-ready/operation-completed rear doors are set are indicated by operation-ready/operation-completed workpiece mounting pallets R1 to Ry.

As shown in FIG. 2A, when the workpiece transferring operation device 3 (carriage 3*a*) is on standby at the beginning end position of the reciprocating movement path, the workpiece receiving transfer means 36A and 36B are in an empty state, the operation-ready workpiece mounting pallet Fx is transferred onto the roller conveyor unit 58 of the workpiece pushing/placing transfer means 37A, and the operation-ready workpiece mounting pallet Rx is transferred onto the roller conveyor unit 58 of the workpiece pushing/placing transfer means 37B. In this state, the passive portions 40 of the transmission means 27 included in the workpiece transferring operation device 3 (carriage 3*a*) are located at the fixed positions P2 and P4, as indicated by solid lines in FIG. 8, the transmission member receiving rollers 42 of the respective passive portions 40 are at the lowering limit position by the raising/lowering member 41 and as indicated by imaginary lines in FIG. 9B, the sandwiching member 43 is switched to a retracting position by the cylinder unit 47. On the other hand, in a state shown in FIG. 2A, the conveying carriage 1 on the front side which conveys the operation-completed workpiece mounting pallet F1 travels in front of the fixed position P2 toward the fixed position P1, and the conveying carriage 1 on the rear side which conveys the operation-completed workpiece mounting pallet R1 travels in front of the fixed position P1 toward the fixed position P1. Then, the two front and rear conveying carriages 1 which are first brought into an empty state after the operation-completed front door and the operation-completed rear door are unloaded at the workpiece receiving transfer means 36A and 36B travel in front of the fixed positions P4 and P3 toward the fixed positions P4 and P3.

On the other hand, the transmission members 28 of the transmission means 27 are attached to, among the four conveying carriages 1 which respectively travel in front of the fixed positions P1 to P4, the conveying carriage 1 which travels directly in front of the fixed position P2, that is, the conveying carriage 1 on the front side which conveys the operation-completed workpiece mounting pallet F1 and the conveying carriage 1 which travels directly in front of the fixed position P4 and which is in an empty state. In these transmission members 28, when the conveying carriage 1 passes the fixed position P1, the cam follower roller 31 rides on the fixed cam rail 52, as the conveying carriage 1 travels, the transmission member 28 in the retracting posture of the lowering limit is moved upward around the horizontal support shaft 30 against gravity, the upper end portion 28*d* of the arc-shaped extended portion 28*a* which closes the opening portion 32 of the floor board 8 is raised up to a certain height above the floor board 8 and thus the posture is switched to the operating posture. Therefore, when the conveying carriages 1 including the transmission members 28 whose posture is switched to the operating posture reach the fixed positions P2 and P4 from in front of the fixed positions P2 and P4, the contact surfaces 28*e* of the upper end portions 28*d* of the transmission members 28 collide against the transmission member receiving rollers 42 which are switched to the lowering limit positions of the two front and rear passive portions 40 in the workpiece transferring operation device 3 (carriage 3*a*) which is on standby at the beginning end position of the reciprocating movement path. The sandwiching member 43 which is provided together with the passive portion 40 is switched to the retracting position, therefore, the transmission member 28 passes the lateral side of the sandwiching member 43.

The workpiece transferring operation device 3 (carriage 3a) which is on standby at the beginning end position of the reciprocating movement path receives, by the operation described above, the forward forces of the two conveying carriages 1 from the transmission members 28 of the two conveying carriages 1 reaching the fixed positions P2 and P4 which are in the operating posture via the transmission member receiving rollers 42 of the passive portions 40 which are at the operating position of the lowering limit, and thus the workpiece transferring operation device 3 (carriage 3a) starts to travel together synchronously with the two conveying carriages 1. Immediately after the situations are achieved, the sandwiching member 43 which is provided together with each of the passive portions 40 is turned by the cylinder unit 50 around the vertical support shaft 49 horizontally from the retracting position to the operating position, and thus as indicated by the solid lines in FIG. 8 and the imaginary lines in FIG. 9B, the upper end portion 28d of the transmission member 28 can be sandwiched between the transmission member receiving roller 42 of the passive portion 40 and the sandwiching portion 43a of the sandwiching member 43. By the sandwiching movement of the sandwiching member 43 described above, the workpiece transferring operation device 3 and the two conveying carriages 1 are fully integrated, it is therefore possible to reliably make the workpiece transferring operation device 3 travel synchronously with the conveying carriages 1.

It is noted that, when the transmission member 28 is moved upward via the fixed cam rail 52 and the cam follower roller 31 so as to switch to the operating posture, the cam follower roller 31 rolls on the upper surface of the fixed cam rail 52, and here, it is possible to configure such that a slight gap is left between the contact portion 28c for determining the raising limit of the transmission member 28 and the raising limit stopper 34, the angle of the contact surface 28e of the transmission member upper end portion 28d when the cam follower roller 31 rides on the upper surface of the fixed cam rail 52 is slightly inclined in a direction located forward as the transmission member 28 is raised higher, and further, the height of contact between the sandwiching portion 43a of the sandwiching member 43 and the rear end corner portion of the transmission member upper end portion 28d is set slightly lower than the height of contact between the transmission member receiving roller 42 and the contact surface 28e of the transmission member upper end portion 28d such that when the upper end portion 28d of the transmission member 28 is sandwiched between the sandwiching member 43 and the transmission member receiving roller 42 of the passive portion 40, an upward turning force acts on the transmission member 28, with the result that when the transmission member 28 is further slightly moved upward by the turning force such that the contact portion 28c makes contact with the raising limit stopper 34, as shown in FIG. 8, the cam follower roller 31 of the transmission member 28 is slightly floated up from the upper surface of the fixed cam rail 52.

Figure 2C:
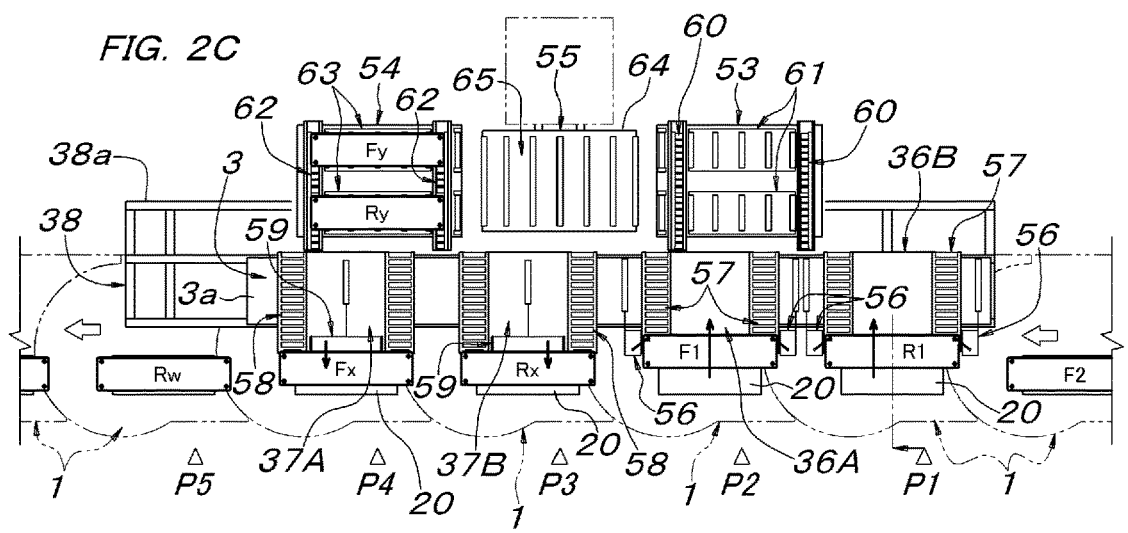

As described above, the workpiece transferring operation device 3 which is on standby at the beginning end position of the reciprocating movement path receives, as shown in FIG. 2, thrust in a forward direction from the two conveying carriages 1 reaching the fixed positions P2 and P4 via the transmission members 28 and the passive portions 40, and thereby starts to travel together synchronously with the conveying carriages 1, and immediately after the workpiece transferring operation device 3 starts to travel synchronously, as shown in FIG. 2C, the workpiece receiving transfer means 36A and 36B and the workpiece pushing/placing transfer means 37A and 37B of the workpiece transferring operation device 3 are activated. That is, the workpiece mounting pallet lead-in means 56 of the workpiece receiving transfer means 36A and 36B lead the operation-completed workpiece mounting pallets F1 and R1 on the workpiece support portions 20 of the two conveying carriages 1 adjacent to the inner sides of the workpiece receiving transfer means 36A and 36B onto the roller conveyor units 57, and by the roller conveyor units 58 and the workpiece mounting pallet pushing/placing means 59 of the workpiece pushing/placing transfer means 37A and 37B, the operation-ready workpiece mounting pallets Fx and Rx which are transferred on the roller conveyor units 58 are pushed and placed on the workpiece support portions 20 of the two conveying carriage 1 adjacent to the inner sides of the workpiece pushing/placing transfer means 37A and 37B.

Figure 3A:
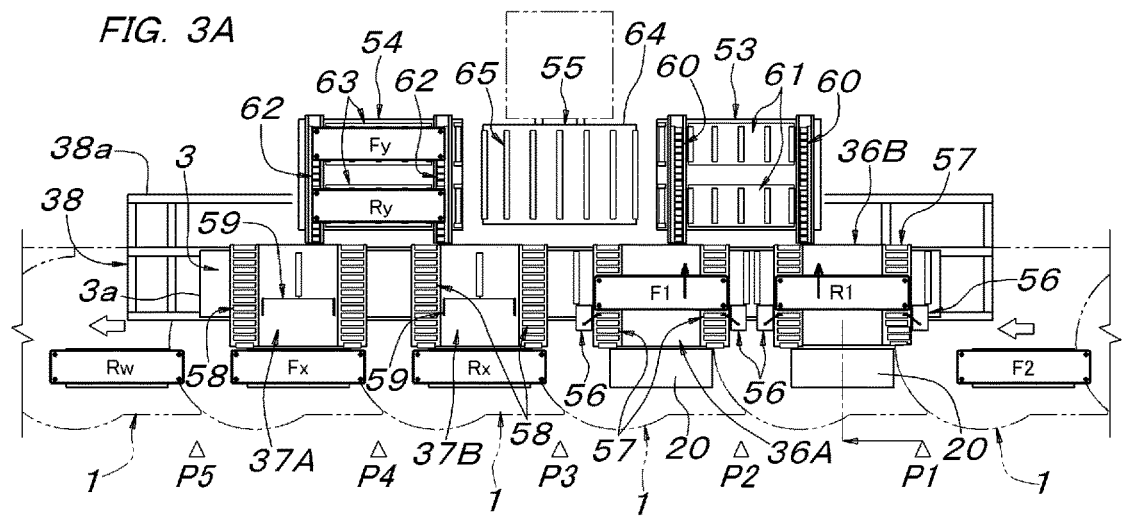
FIGS. 3A to 3C are schematic plan views illustrating situations in which the operation device after the completion of the workpiece transfer is fed fast to the terminal end position of the reciprocating movement path, and thereafter the retreat-travel of the operation device at a high speed to the beginning end position of the reciprocating movement path is completed.

FIG. 3A shows a stage in which after the workpiece transferring operation device 3 starts to travel synchronously with the conveying carriages 1, the workpiece transferring operation device 3 travels synchronously nearly a half of the length of the reciprocating movement path corresponding to the length of one conveying carriage 1. At this stage, as shown in the figure, in the workpiece receiving transfer means 36A and 36B, the workpiece mounting pallet lead-in means 56 are retreated and returned to the original standby positions, and the operation-completed workpiece mounting pallets F1 and R1 are fed to the terminal end positions on the roller conveyor units 57 whereas in the workpiece pushing/placing transfer means 37A and 37B, the workpiece mounting pallet pushing/placing means 59 are retreated and returned to the original standby positions. When this stage is reached, in order to release the interlocked state of the transmission members 28 of the two conveying carriages 1 located at positions corresponding to the workpiece receiving transfer means 36A and the workpiece pushing/placing transfer means 37A and the two front and rear passive portions 40 on the side of the workpiece transferring operation device 3, the sandwiching member 43 is switched by the cylinder unit 50 from the operating position to the retracting position (see the imaginary lines in FIG. 9), the passive portion 40 (transmission member receiving roller 42) is switched by the cylinder unit 47 to the retracting position of the raising limit, thereafter the cylinder unit 35 which has so far performed the extension operation by following the synchronous travel of the workpiece transferring operation device 3 is switched to a forcible extension operation, and by the cylinder unit 35, the workpiece transferring operation device 3 is made to travel forward at a high speed to the terminal end position of the reciprocating movement path (see FIG. 3B).

Figure 3B:
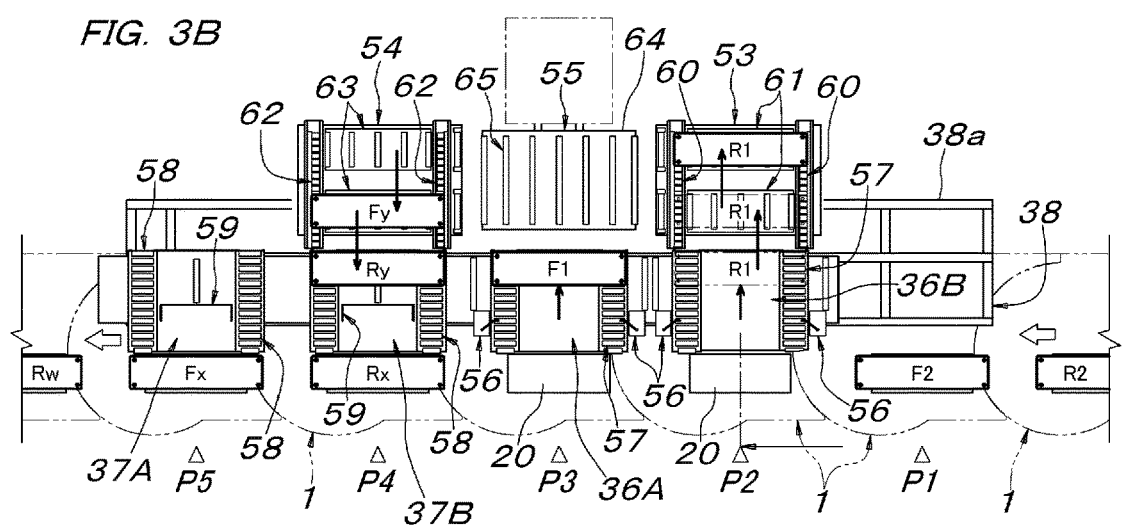
Figure 3C:
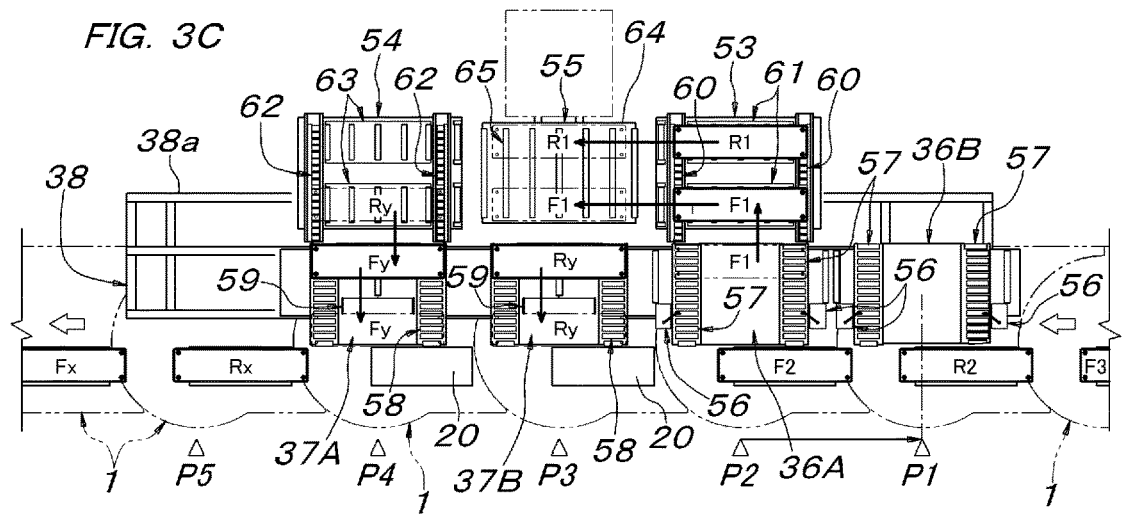
Figure 4A:
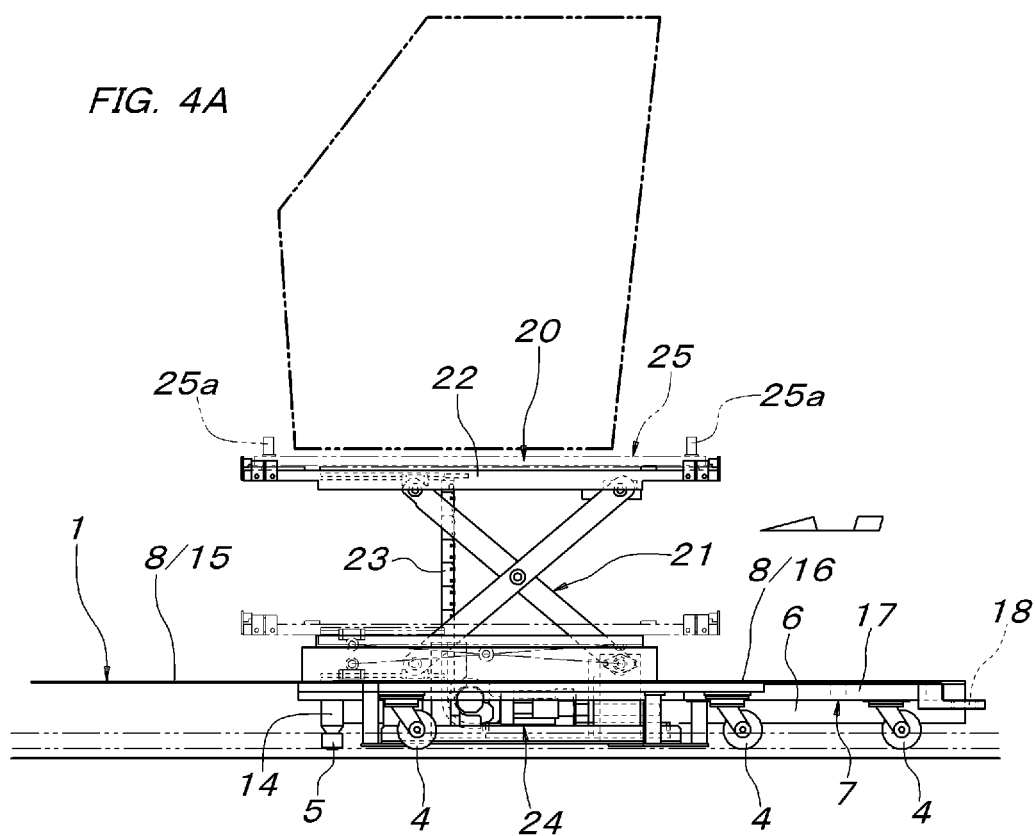
FIG. 4A is a side view of one conveying carriage and FIG. 4B is a plan view of the conveying carriage.
Figure 4B:
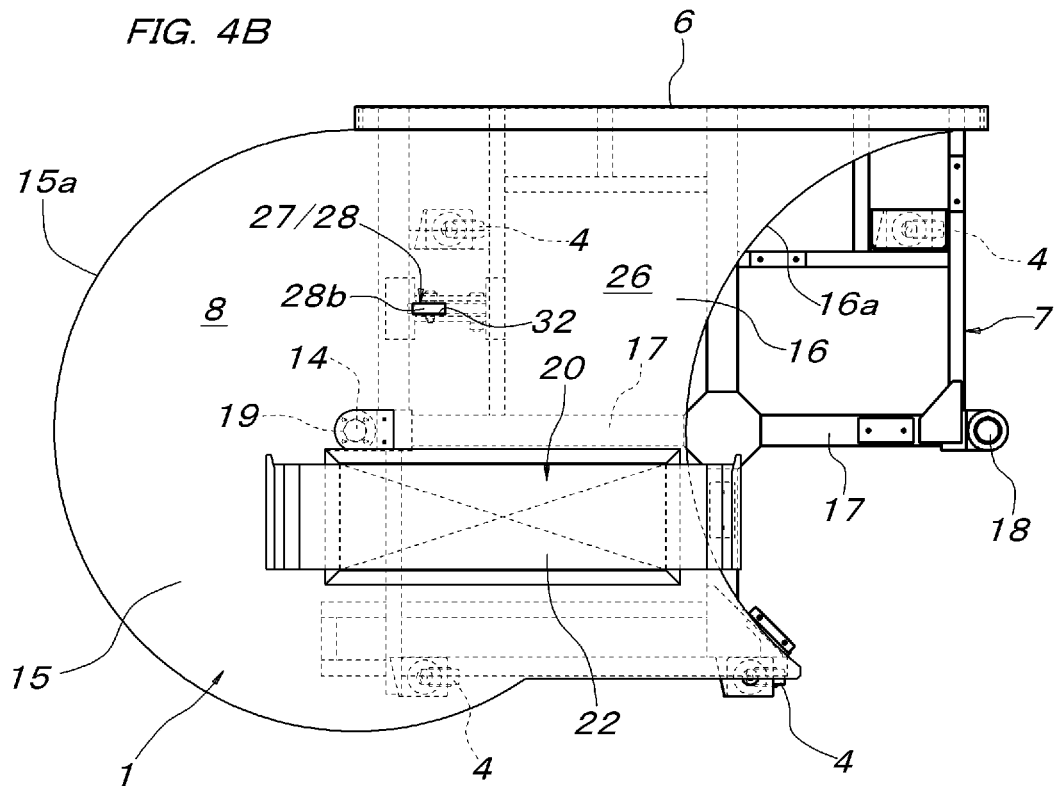

As shown in FIG. 3B, when the workpiece transferring operation device 3 reaches the terminal end position of the reciprocating movement path, the workpiece receiving transfer means 36A and 36B and the workpiece pushing/placing transfer means 37A and 37B located at the fixed positions P1 to P4 advance to the fixed positions P2 to P5, and a state is brought about in which the workpiece receiving transfer means 36B is connected to the workpiece carry-out conveyor 53 and the workpiece pushing/placing transfer means 37B is connected to the workpiece carry-in conveyor 54. At this stage, the roller conveyor units 57 of the workpiece receiving transfer means 36B and the roller conveyor unit 60 of the workpiece carry-out conveyor 53 are activated, and thus the operation-completed workpiece mounting pallet R1 is transferred from the top of the workpiece receiving transfer means 36B to the fixed position in front of and on the top of the workpiece carry-out conveyor 53, and with respect to the two operation-ready workpiece mounting pallets Ry and Fy which are on standby in a parallel state on the roller conveyor units 62 of the workpiece carry-in conveyor 54, the roller conveyor units 62 and the roller conveyor unit 57 of the workpiece pushing/placing transfer means 37B are activated, and thus only the operation-ready workpiece mounting pallet Ry is transferred onto the workpiece pushing/placing transfer means 37B and the operation-ready subsequent workpiece mounting pallet Fy is laterally moved to the position where the operation-ready workpiece mounting pallet Ry was present.

In the subsequent stage, the cylinder unit 35 which is at an extension limit is contracted to a contraction limit, and thus the workpiece transferring operation device 3 at the terminal end position of the reciprocating movement path is made to travel to retreat at a high speed to the original standby position as shown in FIG. 3C. The workpiece transferring operation device 3 is returned to the original standby position, and thus the workpiece receiving transfer means 36A and 36B and the workpiece pushing/placing transfer means 37A and 37B located at the fixed positions P2 to P5 are returned to the original fixed positions P1 to P4. Therefore, the operation-completed workpiece mounting pallet F1 which is on standby at the terminal end position on the roller conveyor unit 57 of the workpiece receiving transfer means 36A is conveyed and transferred to the fixed position in front of and on the top of the workpiece carry-out conveyor 53 by the roller conveyor unit 57 and the roller conveyor unit 60 of the workpiece carry-out conveyor 53 adjacent to the outer side. By this movement, the operation-completed workpiece mounting pallet R1 which is transferred to the fixed position in front of and on the top of the workpiece carry-out conveyor 53 is moved to a rear→far side fixed position on the workpiece carry-out conveyor 53.

On the other hand, the workpiece pushing/placing transfer means 37A returned to the original fixed position P4 is returned to a state where the workpiece pushing/placing transfer means 37A is connected to the workpiece carry-in conveyor 54, and thus at this stage, the roller conveyor unit 58 of the workpiece pushing/placing transfer means 37A and the roller conveyor unit 62 of the workpiece carry-in conveyor 54 are activated such that the operation-ready workpiece mounting pallet Fy which is on standby in the fixed position in front of the workpiece carry-in conveyor 54 is transferred onto the workpiece pushing/placing transfer means 37A. By the movements described above, in the workpiece transferring operation device 3 which is returned to the beginning end position of the reciprocating movement path, as in the first situation shown in FIG. 2A, the workpiece receiving transfer means 36A and 36B are in an empty state, and the workpiece pushing/placing transfer means 37A and 37B are brought into a state where the operation-ready workpiece mounting pallets Fy and Ry are transferred onto the roller conveyor units 58.

It is noted that, as shown in FIG. 3C, the operation-completed workpiece mounting pallets R1 and F1 which are transferred, in a parallel state, onto the roller conveyor unit 60 of the workpiece carry-out conveyor 53 are moved onto the raising/lowering roller conveyor unit 61 by raising the raising/lowering roller conveyor unit 61 to the raising limit, and are thereafter transferred onto the raising/lowering carriage 64 by activating the roller conveyor unit 65 on the raising/lowering carriage 64 of the workpiece raising/lowering conveying means 55 which is lowered to the same level as the raising/lowering roller conveyor unit 61 in the raising limit and the raising/lowering roller conveyor unit 61, with the result that the operation-completed workpiece mounting pallets R1 and F1 can be conveyed by the workpiece raising/lowering conveying means 55 to the intended floor. A set of two rows of operation-ready workpiece mounting pallets which are transferred from another floor by being transferred onto the raising/lowering carriage 64 of the workpiece raising/lowering conveying means 55 can be transferred onto the workpiece carry-in conveyor 54 in an empty state by the roller conveyor unit 65 on the raising/lowering carriage 64 and the raising/lowering roller conveyor unit 63 raised to the raising limit of the workpiece carry-in conveyor 54, and can be transferred onto the roller conveyor unit 62 for carrying the operation-ready workpiece mounting pallets into the workpiece pushing/placing transfer means 37A and 37B.

As shown in FIGS. 1 and 6, etc., the workpiece mounting pallet lead-in means 56 included in the workpiece receiving transfer means 36A and 36B include check levers 56a for hooking and leading in a pair of pins 25a on both sides of the lead-in side among pins 25a which are provided so as to stand at four corners of the workpiece mounting pallet 25, and as shown in FIG. 1, etc., the workpiece mounting pallet pushing/placing means 59 includes a pair of pushers 59a for directly pushing the sides of the workpiece mounting pallet 25. As a matter of course, the specific configurations of the workpiece support portion 20 on the conveying carriage 1 and the workpiece transferring operation device 3 are changed depending on the size, the form, the weight and the like of the workpiece to be handled, and the configurations described in the above embodiment are merely an example. The operation device in the present invention is not limited to the workpiece transferring operation device 3 which transfers the workpiece between the workpiece transferring operation device 3 and the conveying carriages 1. As a matter of course, even when the workpiece transferring operation device 3 is used as the operation device, the workpiece transferring operation device 3 described in the above embodiment is merely an example.

The conveying operation equipment of the present invention can be particularly effectively utilized for loading and unloading, in automobile assembly equipment, parts on and from conveying carriages on a conveying operation line in which necessary operations are performed while the automobile parts such as a door are being conveyed.

What is claimed is:
1. Conveying operation equipment comprising:
 conveying carriages coupled to each other and configured so as to travel in a traveling path;
 an operation device for workpieces on the conveying carriages, and the operation device having a reciprocating movement path arranged in parallel to the traveling path;
 a synchronous forward-traveling means operable to cause the operation device to travel synchronously with the conveying carriage to be operated from a beginning end position to a terminal end position of the reciprocating movement path and a high speed retreat-traveling means operable to cause the operation device to retreat at a high speed from the terminal end position to the beginning end position of the reciprocating movement path;
 each conveying carriage having an operating region between a workpiece loading region and a side of the conveying carriage;

the reciprocating movement path being provided such that part or a whole of the operation device is overlaid on the operating region of the conveying carriage;

the synchronous forward-traveling means comprising a transmission means which is formed with a transmission member that is provided in an upper portion of the conveying carriage and a passive portion that is provided in a bottom portion of the operation device so as to be pushed from the rear by the transmission member and a transmission state switching means which switches the transmission means to a transmission state at the beginning end position of the reciprocating movement path and which switches the transmission means to a transmission release state at the terminal end position of the reciprocating movement path.

2. The conveying operation equipment according to claim 1, wherein the transmission member of the transmission means is pivotally supported so as to be able to vertically swing between an operating posture of a raising limit and a retracting posture of a lowering limit through an opening portion provided in a floor surface of the conveying carriage, and when the transmission member is in the retracting posture of the lowering limit, an upper end portion of the transmission member is flush with the floor surface so as to block the opening portion.

3. The conveying operation equipment according to claim 2, wherein a sandwiching member is provided together with the passive portion of the transmission means, the sandwiching member being operable to sandwich, with the passive portion, the upper end portion of the transmission member in the operating posture that makes contact with the passive portion and the sandwiching member is freely switched between an operating position where the upper end portion of the transmission member is sandwiched and a retracting position where the sandwiching member does not interfere with the transmission member.

4. The conveying operation equipment according to claim 3, wherein the passive portion of the transmission means is attached to a raising/lowering member, when the raising/lowering member is in the lowering limit, the upper end portion of the transmission member can be sandwiched between the passive portion and the sandwiching member whereas when the raising/lowering member is in the raising limit, the passive portion is separated upward from the transmission member in the operating position, and a transmission member receiving roller which is self-rotated when the passive portion is relatively vertically moved with the transmission member is pivotally supported on the passive portion.

5. The conveying operation equipment according to claim 4, wherein a cam follower roller is attached to the transmission member, the transmission state switching means is formed with a fixed cam rail which is laid along the reciprocating movement path of the operation device such that the transmission member is switched via the cam follower roller to the operating posture and that the operating posture is held, and when the upper end portion of the transmission member is sandwiched between the sandwiching member and the passive portion, the transmission member in the operating posture is moved upward such that the cam follower roller is separated from the fixed cam rail.

6. The conveying operation equipment according to claim 3, wherein a cam follower roller is attached to the transmission member, the transmission state switching means is formed with a fixed cam rail which is laid along the reciprocating movement path of the operation device such that the transmission member is switched via the cam follower roller to the operating posture and that the operating posture is held, and when the upper end portion of the transmission member is sandwiched between the sandwiching member and the passive portion, the transmission member in the operating posture is moved upward such that the cam follower roller is separated from the fixed cam rail.

7. The conveying operation equipment according to claim 2, wherein a cam follower roller is attached to the transmission member, and the transmission state switching means is formed with a fixed cam rail which is laid along the reciprocating movement path of the operation device such that the transmission member is switched via the cam follower roller to the operating posture and that the operating posture is held.

8. The conveying operation equipment according to claim 1, wherein the reciprocating movement path is formed with an operation device supporting guide rail which is laid on a cantilever support frame that overhangs from a frame installed beside the traveling path of the conveying carriage over the conveying carriage, and the operation device has such a lateral width that the entire operation device is overlaid on the operating region of the conveying carriage.

9. The conveying operation equipment according to claim 8, wherein the operation device includes a workpiece transferring means which is operable to transfer the workpiece to and from a workpiece support portion on the conveying carriage, a workpiece conveying conveyor device is provided beside the traveling path of the conveying carriage such that part or a whole thereof is overlaid on the frame, and the workpiece is transferred between the workpiece conveying conveyor device and the workpiece transferring means on the operation device.

* * * * *